(12) United States Patent
Shaheen

(10) Patent No.: US 7,179,021 B2
(45) Date of Patent: Feb. 20, 2007

(54) CUTTING INSERT HOLDER

(75) Inventor: Philip Shaheen, Tarshiha (IL)

(73) Assignee: Iscar Ltd., Tefen (IL)

( * ) Notice: Subject to any disclaimer, the term of this patent is extended or adjusted under 35 U.S.C. 154(b) by 16 days.

(21) Appl. No.: 11/155,661

(22) Filed: Jun. 20, 2005

(65) Prior Publication Data

US 2005/0232711 A1    Oct. 20, 2005

Related U.S. Application Data

(63) Continuation of application No. PCT/IL03/001034, filed on Dec. 8, 2003.

(30) Foreign Application Priority Data

Jan. 5, 2003    (IL) ..................... 153796

(51) Int. Cl.
    B23B 29/12    (2006.01)
(52) U.S. Cl. ................... 407/107; 407/101; 407/99
(58) Field of Classification Search ............. 407/85, 407/99, 107, 101–104, 109
    See application file for complete search history.

(56) References Cited

U.S. PATENT DOCUMENTS

| | | | | |
|---|---|---|---|---|
| 3,066,385 A | * | 12/1962 | Vana | ............... 407/110 |
| 3,568,283 A | | 3/1971 | Wyss | |
| 4,876,932 A | * | 10/1989 | Nessel | ................ 82/158 |
| 5,222,841 A | * | 6/1993 | Simkhovich | ............. 407/5 |
| 5,586,844 A | | 12/1996 | Nyman | |
| 6,004,081 A | * | 12/1999 | Hellstrom et al. | .......... 407/103 |
| 6,050,751 A | * | 4/2000 | Hellstrom | .............. 407/104 |
| 6,481,936 B1 | * | 11/2002 | Hecht | ................ 407/111 |
| 6,607,333 B2 | * | 8/2003 | Satran et al. | .............. 407/33 |
| 6,769,843 B2 | * | 8/2004 | Hansson | ................ 407/91 |

FOREIGN PATENT DOCUMENTS

| | | |
|---|---|---|
| DE | 20 31 832 | 12/1971 |
| DE | 38 38 816 | 5/1990 |
| SU | 780 970 | 11/1980 |

OTHER PUBLICATIONS

Louis De Vries, German-English Technical and Engineering Dictionary, 1950, McGraw-Hill Book Company, Inc., p. 258, right hand Column.*

* cited by examiner

*Primary Examiner*—Daniel W. Howell
*Assistant Examiner*—Sara Addisu
(74) *Attorney, Agent, or Firm*—Womble Carlyle

(57) ABSTRACT

A cutting insert holder for releasably clamping a quadrilateral cutting insert in a predetermined clamping position, the cutting insert having a through bore and a non-obtuse insert mounting corner. The cutting insert holder includes a clamping portion formed with a wedge supporting surface and a locking pin received in the through bore. A clamping wedge abuts the wedge supporting surface and has an insert receiving pocket with a pair of pocket side walls forming an insert receiving corner for receiving the insert mounting corner. In a top view of the base surface a normal to the wedge supporting surface passing through a center of the locking pin passes through a first pocket side wall of the pair of pocket side walls.

21 Claims, 10 Drawing Sheets

CUTTING INSERT HOLDER

RELATED APPLICATIONS

This is a Continuation of International Application No. PCT/IL03/001034, filed Dec. 8, 2003 and published in English as WO 2004/060595 A1 on Jul. 22, 2004. The contents of the above-identified international application are incorporated by reference.

FIELD OF THE INVENTION

The invention relates to a cutting insert holder with a clamping wedge for releasably clamping a cutting insert.

BACKGROUND OF THE INVENTION

In U.S. Pat. No. 5,586,844 to Nyman, there is illustrated and described a cutting insert holder with a clamping wedge for releasably clamping a cutting insert with an obtuse insert mounting corner in a symmetrical seating arrangement whereupon the cutting insert assumes a predetermined clamping position.

In FIGS. 1, 2 and 3 corresponding, respectively, to FIGS. 1, 3 and 5 of U.S. Pat. No. 5,586,844 to Nyman, but with different reference numerals, a cutting tool comprises a cutting insert holder 10 with a clamping wedge 12 that releasably clamps a cutting insert 14 in a symmetrical seating arrangement whereupon the cutting insert 14 assumes a predetermined clamping position. The cutting insert 14 has a throughbore 16, obtuse insert mounting corners 18 and non-obtuse cutting corners 20.

The cutting insert holder 10 has a holder body 22 with a top surface 24 and a bottom surface 26 and a recessed forward end portion 28 in the top surface 24 which defines an insert site. The insert site having an inclined wedge supporting surface 30 extending downwardly and forwardly from the top surface 24 toward a base surface 32 of the insert site. The cutting insert 14 is located at the insert site and is supported by a shim 34 positioned on the base surface 32. A generally upstanding rigidly mounted locking pin 36 is located in a bore 38 in the holder body 22 which opens out into the base 32. The locking pin 36 passes through a hole 40 in the shim 34 with a head portion 42 thereof located in the insert's throughbore 16. The clamping wedge 12 is located in recessed leading portion 28 wedged between the supporting surface 30 and the cutting insert 14. On the underside of the clamping wedge 12 is an insert receiving pocket 44 having an insert receiving corner 46 for receiving the cutting insert's mounting corner 18. The insert receiving corner is formed at the intersection of two planes passing through a pair of spaced-apart lower protrusions 48. The angle θ of the insert receiving corner is substantially equal in magnitude to the insert's mounting corner angle Φ. The clamping wedge 12 is upwardly biased by a spiral shaped spring 50 received in a counterbore 52 of a screw threaded clamping bore 54 in which a clamping screw 56 is threadingly received for slidingly urging the clamping wedge 12 down the wedge supporting surface 30 towards the base surface 32. In a top view of the cutting insert holder 10, the insert receiving pocket 44 is disposed relative to the wedge supporting surface 30 such that a normal 58 to the latter passing through a center 60 of the locking pin 36 bisects the insert receiving corner 46 and coincides with the cutting insert's diagonal 62 passing through the operative insert mounting corner 18' and the operative cutting corner 20', thereby rendering the symmetrical seating arrangement for the cutting insert 14.

However, a symmetrical seating arrangement adapted for a cutting insert with a non-obtuse insert mounting corner would not consistently clamp the cutting insert in a predetermined clamping position. Furthermore, it is not possible to use the above described cutting insert holder to releasably clamp both a cutting insert with an obtuse insert mounting corner and a cutting insert with a non-obtuse insert mounting corner.

It is an object of the present invention to provide a cutting insert holder with a clamping wedge for releasably clamping a cutting insert with a non-obtuse insert mounting corner in a predetermined clamping position.

It is a further object of the present invention to provide a cutting insert holder with a clamping wedge for releasably clamping both a cutting insert with an obtuse insert mounting corner and a cutting insert with a non-obtuse insert mounting corner.

SUMMARY OF THE INVENTION

In accordance with one embodiment of the present invention, there is provided a cutting tool which comprises a cutting insert holder comprising a holder body having a rear shank portion and a forward clamping portion, a clamping wedge having an insert receiving pocket, the clamping wedge being in abutment with the wedge supporting surface; and a cutting insert retained in the insert receiving pocket. The forward clamping portion comprises a base surface and a generally upstanding wedge supporting surface extending upwardly and rearwardly from the base surface to a top surface of the clamping portion; and the wedge supporting surface comprises first and second wedge supporting surfaces that are disposed at an angle α one with respect to the other, the two wedge supporting surfaces being arranged in a stepped formation forming a staggered wedge supporting surface with the second wedge supporting surface being adjacent the base surface and the first wedge supporting surface being adjacent the top surface of the clamping portion.

The insert receiving pocket may comprise first and second pocket side walls forming an insert receiving corner. Also, each of the first and second pocket side walls is provided with spaced apart forward and rear abutment surfaces, the forward abutment surface being farther from the insert receiving corner than the rear abutment surface; and the cutting insert bears against the forward and rear abutment surfaces of the first pocket side wall and the forward abutment surface of the second pocket side wall, but not against the rear abutment surface of the second pocket side wall.

The insert receiving pocket further may comprise a top surface extending between the first and second pocket side walls, the top surface having a top abutment surface that abuts a top surface of the cutting insert rearward of a through bore of the cutting insert.

The cutting tool may further comprise a generally upstanding locking pin and a through bore formed in the cutting insert; wherein the locking pin is partially in the base surface and partially in the through bore of the cutting insert.

The wedge supporting surface may be provided with a key slot for receiving a key at a trailing portion of the clamping wedge.

Also, the first and second wedge supporting surfaces may be disposed at an angle α in the range 6° to 15°.

The clamping wedge may have rear support surfaces which abut the first wedge supporting surface, and an insert receiving pocket comprising a pair of pocket side walls forming an obtuse angle insert receiving corner, while the cutting insert may have an insert mounting corner with an obtuse insert mounting corner angle. The cutting insert may be trigon shaped.

The clamping wedge may have rear support surfaces which abut the second wedge supporting surface, and an insert receiving pocket comprising a pair of pocket side walls forming a non-obtuse angle insert receiving corner, while the cutting insert has an insert mounting corner with a non-obtuse insert mounting corner angle. The cutting insert may be quadrilateral shaped and has a mounting corner angle between 80° and 90°.

This second clamping wedge may have a generally upstanding locking pin, and a through bore formed in the cutting insert; wherein the locking pin is partially in the base surface and partially in the through bore of the cutting insert; and a normal to the first wedge supporting surface in a top view of the base surface passes through the center of the locking pin and substantially bisects the non-obtuse angle insert receiving corner.

The normal may form an angle β with a bisector of the insert receiving corner in the range of 4° to 40°.

In another aspect, the present invention is directed to a cutting insert holder comprising a holder body having a rear shank portion and a forward clamping portion, wherein the forward clamping portion comprises a base surface and a generally upstanding wedge supporting surface extending upwardly and rearwardly from the base surface to a top surface of the clamping portion; and the wedge supporting surface comprises first and second wedge supporting surfaces that are disposed at an angle α one with respect to the other, the two wedge supporting surfaces being arranged in a stepped formation forming a staggered wedge supporting surface with the second wedge supporting surface being adjacent the base surface and the first wedge supporting surface being adjacent the top surface of the clamping portion.

Such a cutting insert holder may be configured to selectively accommodate either a first clamping wedge having a first insert receiving pocket comprising a first pair of pocket side walls forming an obtuse angle insert receiving corner, with a rear support surface of the first clamping wedge abutting the first wedge supporting surface; or a second clamping wedge having a second insert receiving pocket comprising a second pair of pocket side walls forming a non-obtuse angle insert receiving corner, with a rear support surface of the second clamping wedge abutting the second wedge supporting surface.

The cutting insert holder's wedge supporting surface may be provided with a key slot for receiving a key at a trailing portion of the first and second clamping wedges.

The first and second wedge supporting surfaces may be disposed at an angle α in the range 6° to 15°.

By virtue of the cutting insert holder of the present invention having an asymmetrical seating arrangement for a quadrilateral cutting insert with a non-obtuse insert mounting corner, the cutting insert holder can repeatedly clamp the cutting insert in a predetermined clamping position. The cutting insert holder of the present invention can be employed with a range of different clamping wedges each dedicated for clamping a specifically shaped cutting insert including inter alia generally rhombic shaped cutting inserts with insert mounting corners in the range of 35° to 90° and generally square shaped cutting inserts with substantially right angle insert mounting corners.

BRIEF DESCRIPTION OF THE DRAWINGS

For a better understanding the invention will now be described, by way of example only, with reference to the accompanying drawings in which.

DETAILED DESCRIPTION OF THE INVENTION

Figure 1:
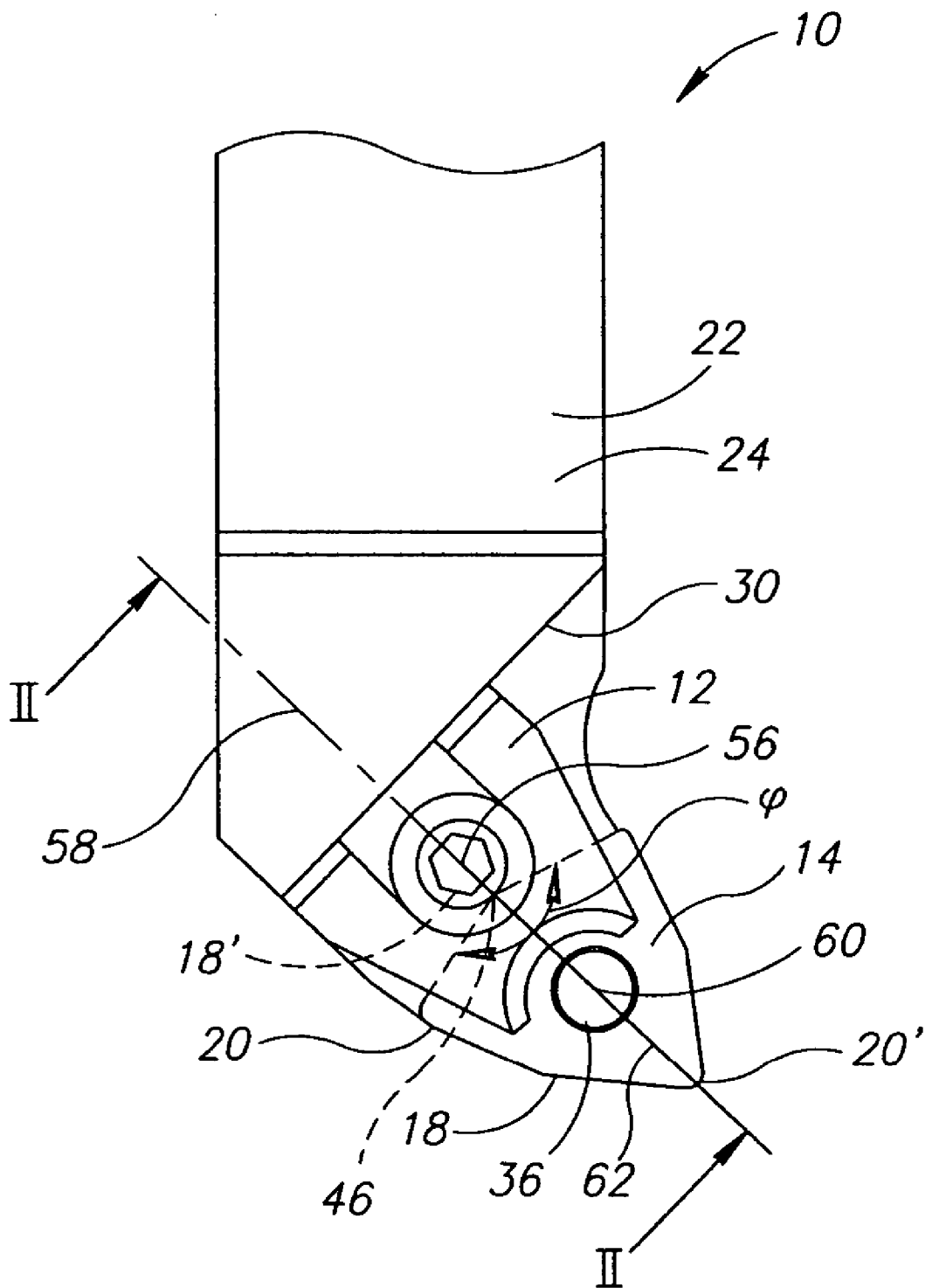
FIG. 1 is a top view of a prior art cutting tool comprising a cutting insert holder with a clamping wedge for releasably clamping a cutting insert with an obtuse insert mounting corner in a predetermined clamping position.
Figure 2:
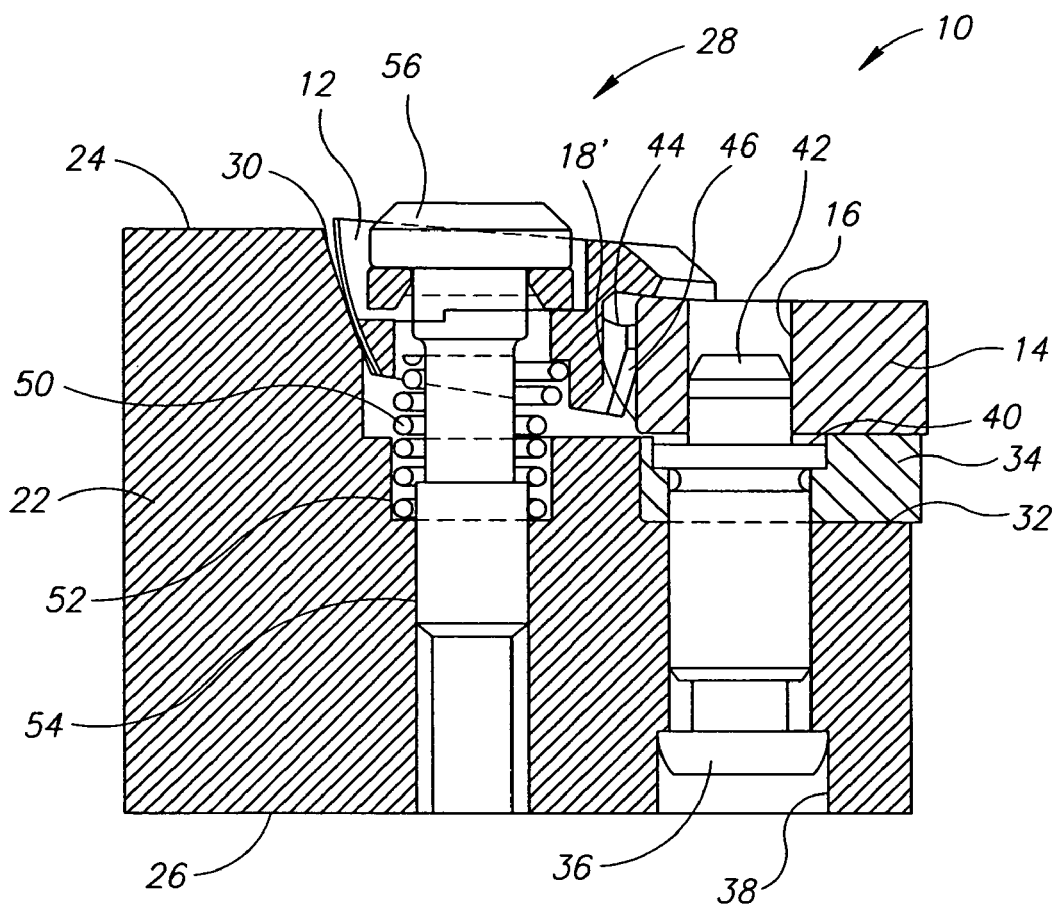
FIG. 2 is a cross sectional view of the cutting tool of FIG. 1 along line II—II in FIG. 1 coinciding with a normal to the wedge supporting surface.
Figure 3:
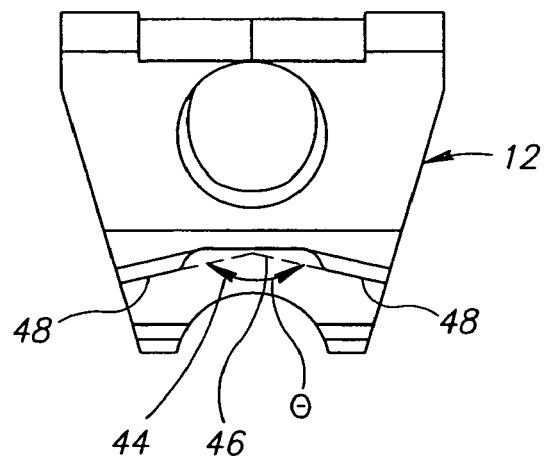
FIG. 3 is a bottom view of the clamping wedge shown in FIGS. 1 and 2.
Figure 4:
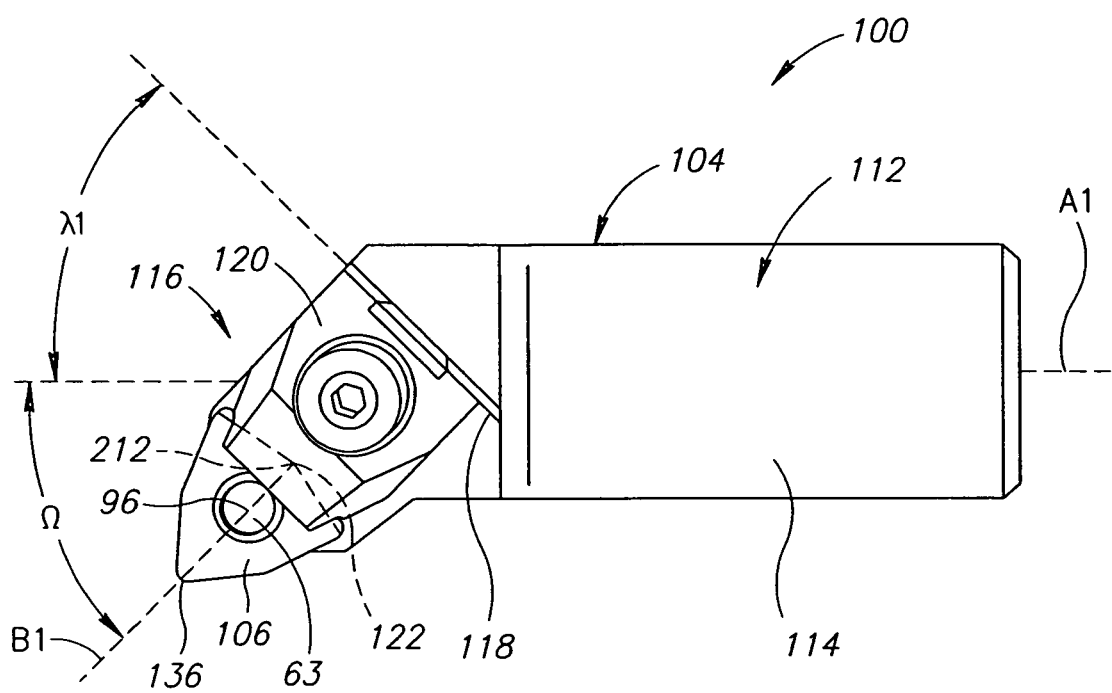
FIG. 4 is a top view of a first cutting tool in accordance with the present invention comprising a cutting insert holder with a clamping wedge for releasably clamping a cutting insert with an obtuse insert mounting corner in a predetermined clamping position.
Figure 5:
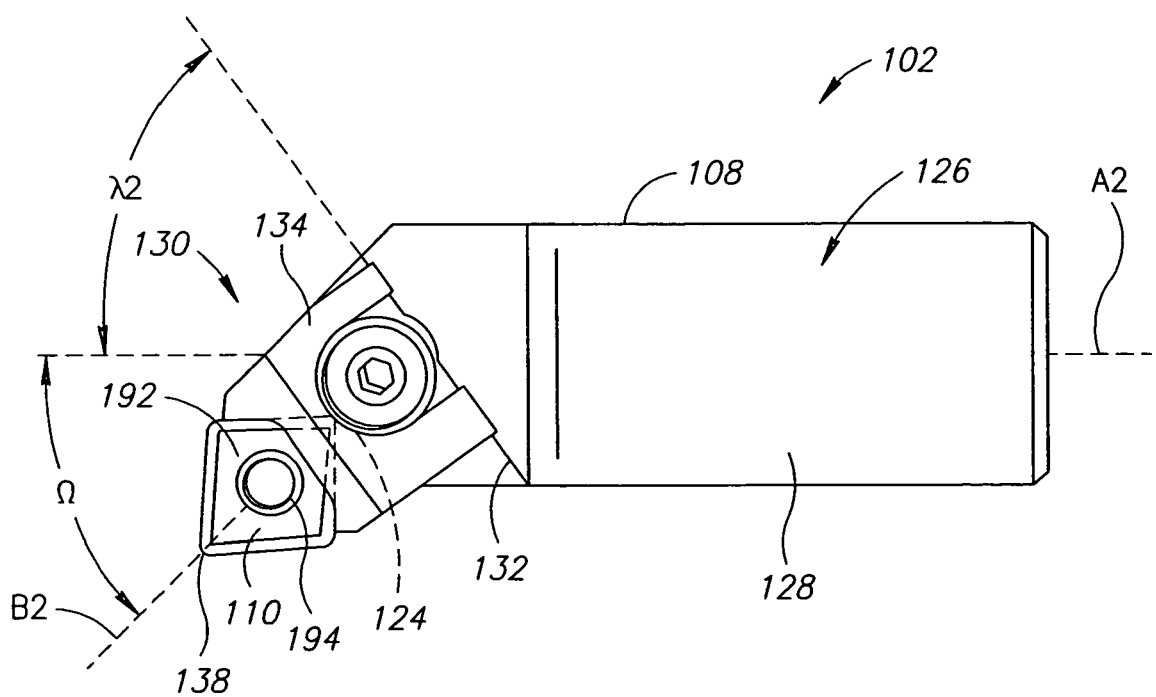
FIG. 5 is a top view of a second cutting tool in accordance with the present invention comprising a cutting insert holder with a clamping wedge for releasably clamping a cutting insert with a non-obtuse insert mounting corner in a predetermined clamping position.

Attention is first drawn to FIGS. 4 and 5 showing first and second cutting tools 100, 102 in accordance with the present invention. Both cutting tools have the same general structure with the first cutting tool 100 comprising a first cutting insert holder 104 and a first cutting insert 106 clamped therein and the second cutting tool 102 comprising a second cutting insert holder 108 and a second cutting insert 110 clamped therein. The first cutting insert holder 104 comprises a first holder body 112 having a first shank portion 114 and a first clamping portion 116, the first clamping portion 116 being provided with a first wedge supporting surface 118, and a first clamping wedge 120 for clamping the first cutting insert 106. The first cutting insert 106 has a first insert mounting corner 122 with an obtuse insert mounting corner angle $\Phi=\Phi 1$. The first cutting insert holder 104, shown in FIG. 4, is similar to the prior art cutting insert holder for clamping a cutting insert with an obtuse angle mounting corner, but has a differently designed clamping wedge as will be described in greater detail below. FIG. 5 shows the second cutting insert holder 108 in accordance with the present invention for clamping the second cutting insert 110. The second cutting insert 110 is quadrilateral and has a second insert mounting corner 124 with a non-obtuse insert mounting corner angle $\Phi=\Phi 2$. The second cutting insert holder 108 comprises a second holder body 126 having a second shank portion 128 and a second clamping portion 130, the second clamping portion 130 being provided with a second wedge supporting surface 132, and a second clamping wedge 134 for clamping the second cutting insert 110. The first shank portion 114 has a first longitudinal axis A1 defining a front to rear direction, with the first clamping portion 116 located at a front end of the first holder body 112. Similarly, the second shank portion 128 has a second longitudinal axis A2 defining a front to rear direction, with the second clamping portion 130 located at a front end of the second holder body 126. The first and second clamping portions 116, 130 of the first and second cutting insert holders 104, 108 are designed to have the same orientation, so that bisectors B1, B2 of the operative cutting corners 136, 138 of the respective cutting inserts 106, 110 make the same angle $\Omega$ with the longitudinal axes A1, A2 of the respective shank portions 114, 128. As will be described in greater detail below, the second cutting insert 110 with the non-obtuse insert mounting corner angle, is not symmetrically seated. Consequently, if the first wedge supporting surface 118 of the first cutting insert holder 104 makes a first angle $\lambda 1$ with respect to the first longitudinal axis A1, then the second wedge supporting surface 132 of the second cutting insert holder 108 will make a second angle $\lambda 2$ with respect to the second longitudinal axis A2, where the first angle $\lambda 1$ is different in magnitude from the second angle $\lambda 2$. In other words, the first wedge supporting surface 118 is acutely disposed to the second wedge supporting surface 132 at an angle $\lambda 2 - \lambda 1 = \alpha$ (see FIG. 10).

A third cutting insert holder 140 in accordance with the present invention is capable of releasably clamping either the first cutting insert 106 with the obtuse insert mounting corner angle, or the second cutting insert 110 with the non-obtuse insert mounting corner angle. The third cutting insert holder 140 comprises a third holder body 142, shown in FIG. 6, which has a rear third shank portion 144 and a forward third clamping portion 146. In order to accommodate both the first and second wedge supporting surfaces 118, 132 that are disposed at an angle $\alpha$ one with respect to the other, the two wedge supporting surfaces 118, 132 are arranged in a stepped formation forming a staggered wedge supporting surface 148 comprising the second wedge supporting surface 132, forming a lower wedge supporting surface, adjacent a base surface 150 of the third clamping portion 146 and the first wedge supporting surface 118, forming an upper wedge supporting surface, adjacent the top surface 152 of the third clamping portion 146. The lower wedge supporting surface 132 is generally upstanding, extending upwardly and rearwardly from the base surface 150 to an intermediate surface 153 located between the base surface 150 and the top surface 152. The lower wedge supporting surface 132 being used to releasably clamp the second cutting insert 110 with the non-obtuse insert mounting corner angle. The upper wedge supporting surface 118 is generally upstanding, extending upwardly and rearwardly from the intermediate surface 153 to the top surface 152. The upper wedge supporting surface 118 being used to releasably clamp the first cutting insert 106 with the obtuse insert mounting corner angle. The staggered wedge supporting surface 148 is provided with a recessed portion 154 which functions as a key slot. This feature will be described below.

Figure 7:
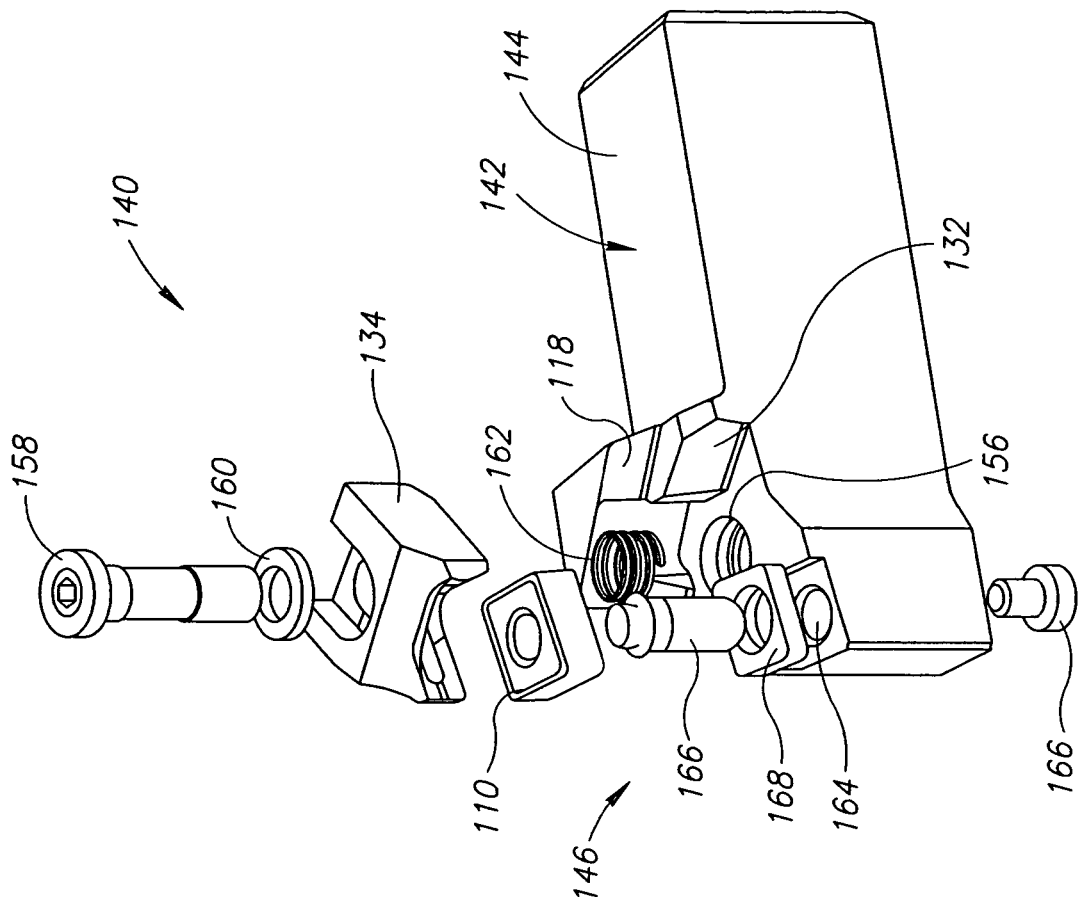
FIG. 7 is an exploded perspective view of the third cutting tool in accordance with the present invention with a clamping wedge for releasably clamping a cutting insert with a non-obtuse insert mounting corner in a predetermined clamping position.
Figure 6:
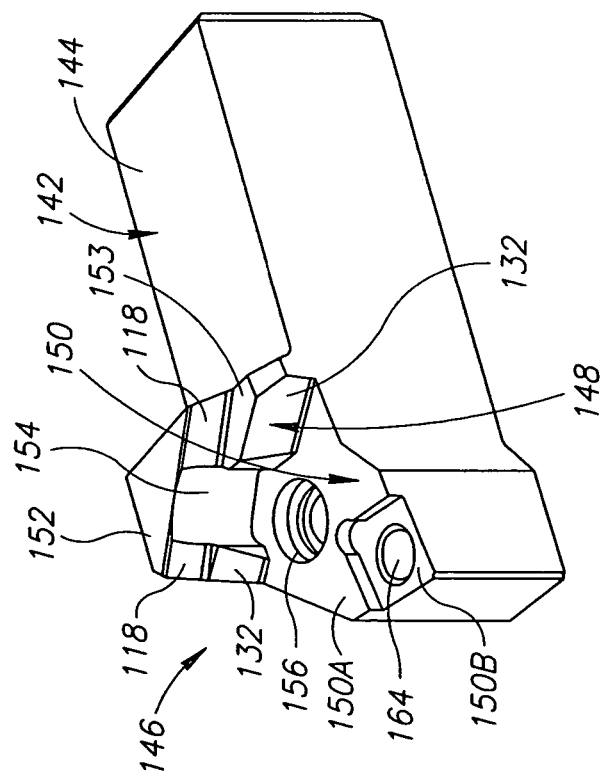
FIG. 6 is a perspective view of a holder body of a third cutting tool in accordance with the present invention for releasably clamping either a cutting insert with an obtuse insert mounting corner or a cutting insert with a non-obtuse insert mounting corner in a predetermined clamping position.
Figure 8:
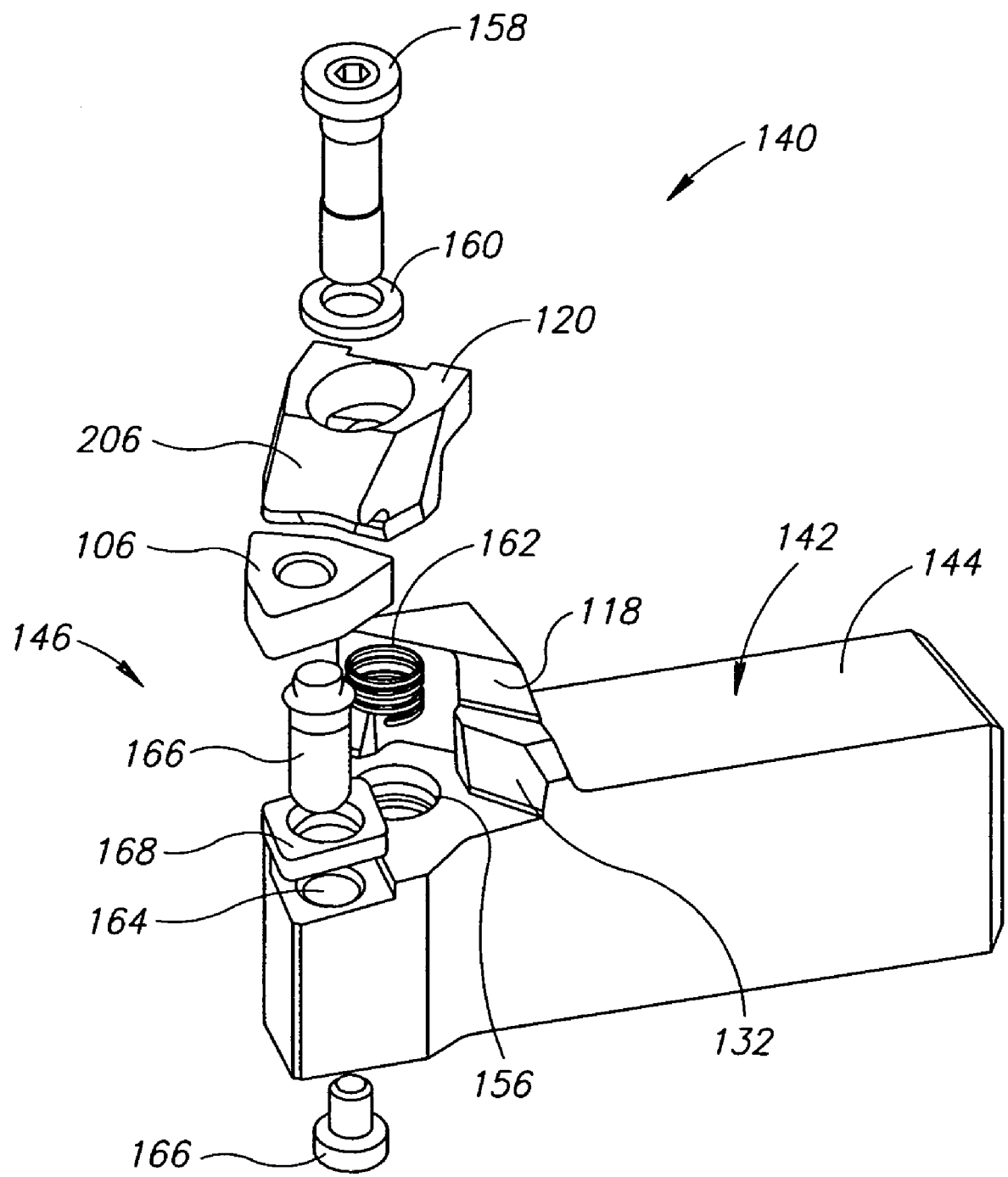
FIG. 8 is an exploded perspective view of a cutting tool in accordance with a preferred embodiment of the present invention with a clamping wedge for releasably clamping a cutting insert with an obtuse insert mounting corner in a predetermined clamping position.
Figure 9A:
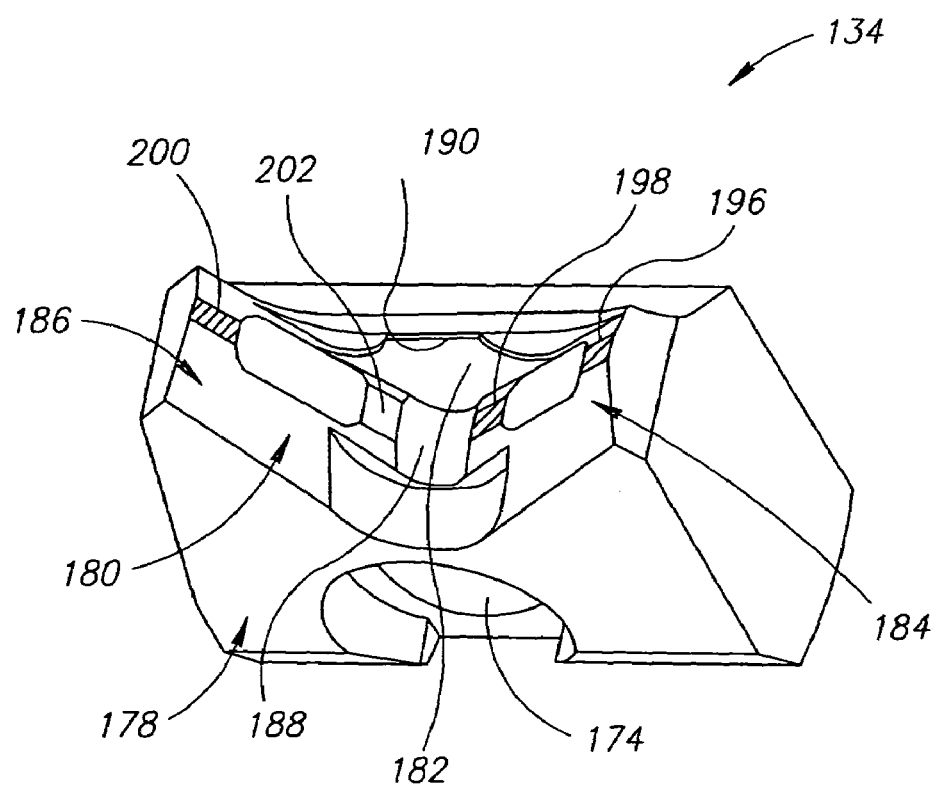
FIG. 9A is a perspective bottom front view of the clamping wedge shown in FIG. 7.
Figure 9B:
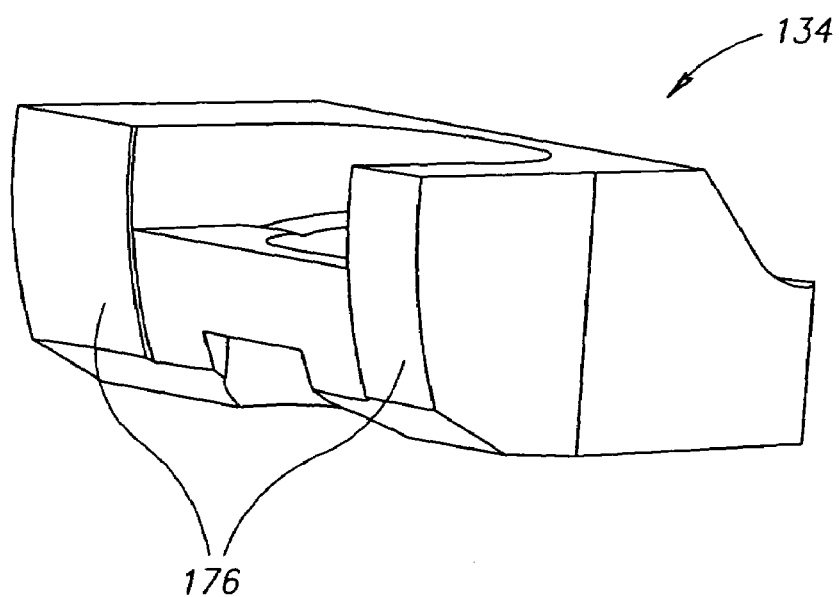
FIG. 9B is a perspective rear view of the clamping wedge shown in FIG. 7.
Figure 9C:
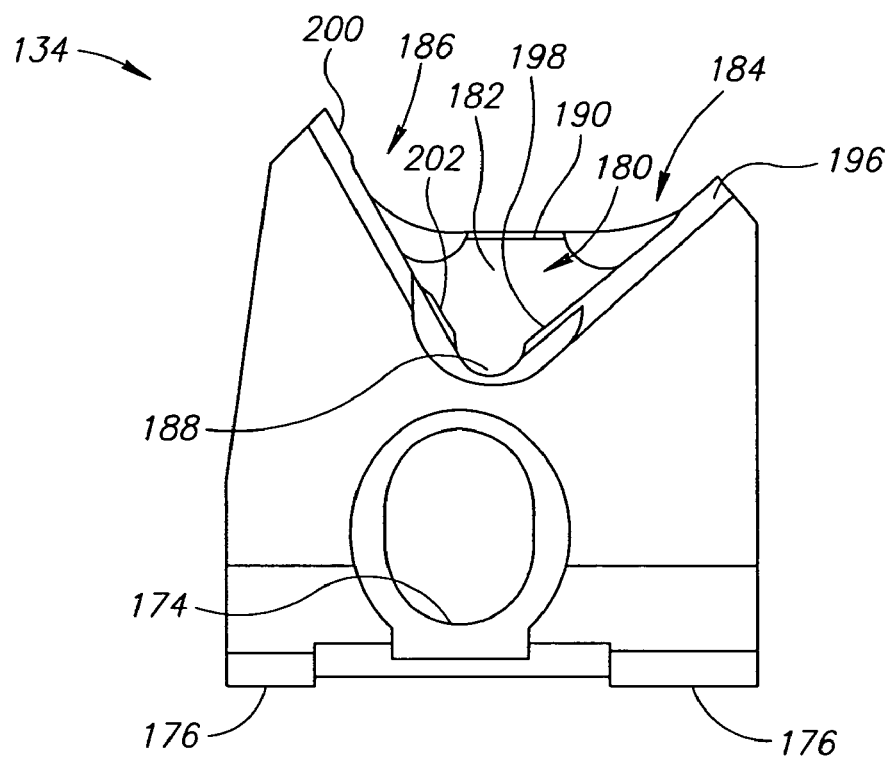
FIG. 9C is a bottom view of the clamping wedge shown in FIG. 7.
Figure 9D:
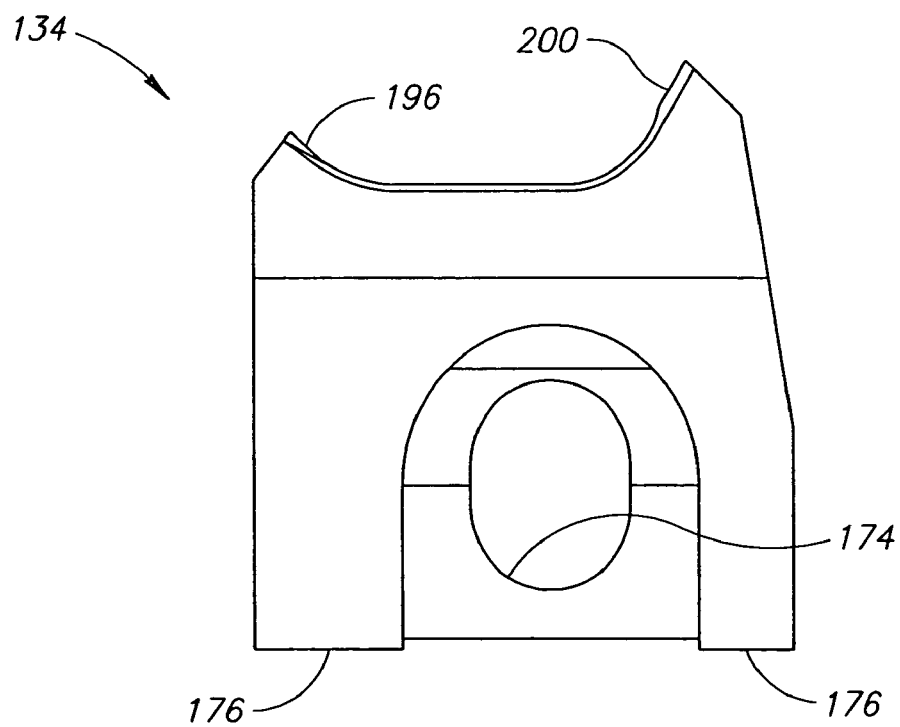
FIG. 9D is a top view of the clamping wedge shown in FIG. 7.

In addition to FIG. 6, reference is now further made to FIGS. 7 and 8. The base surface 150 has a rear portion 150A and a recessed forward portion 150B. The rear portion 150A has a clamping bore 156 for receiving a clamping screw 158 fitted with a spring washer 160, and a spring 162 which can be either a spiral spring, a leaf spring or the like. The recessed forward portion 150B has a bore 164 for receiving a locking pin 166 which can be forcibly or screwingly engaged therein and which can be further held by an additional screw (not shown) at its bottom. A shim 168 is seated in the recessed forward portion 150B and is retained by the locking pin 166. As shown in the Figures, the shim 168 is of a general quadrilateral shape, however, it can be of any other suitable shape to give substantial support to a cutting insert.

The third cutting insert holder 140 can receive either the second clamping wedge 134 for releasably clamping the second cutting insert 110, or the first clamping wedge 120 for releasably clamping the first cutting insert 106. The second clamping wedge 134 is slidingly urgable along the second wedge supporting surface 132 towards the base surface 150 (see FIG. 7). The first clamping wedge 120 is slidingly urgable along the first wedge supporting surface 118 toward the base surface 150 (see FIG. 8). The key slot 154 in the staggered wedge supporting surface 148 is for receiving a key 172 of the first clamping wedge 120 (see FIGS. 11A and 11B) for guiding it into an initially correct position so as to improve repeatable clamping of the first cutting insert 106 in its predetermined clamping position. The second clamping wedge 134 can also be provided with such a key 172.

In FIGS. 9A to 9D, the second clamping wedge 134 has an oval shaped through bore 174 through which the clamping screw 158 freely passes. When screwing the clamping screw 158 down into the clamping bore 156, it urges the second clamping wedge 134 downwards, whereupon rear support surfaces 176 of the second clamping wedge 134 are slidingly urged down the second wedge supporting surface 132. The underside 178 of the second clamping wedge 134 is formed with a second insert receiving pocket 180 having a second pocket top surface 182 and first and second pocket side walls 184, 186 forming a non-obtuse angle insert receiving corner 188 for receiving the second cutting insert's second insert mounting corner 124. The second pocket top surface 182 extends between the first and second pocket side walls 184, 186 and has a top second abutment surface 190 for bearing on the second cutting insert's top surface 192 rearward of the second cutting insert's through bore 194. The first pocket side wall 184 has a pair of spaced apart protruding abutment surfaces, a forward first abutment surface 196 and a rear first abutment surface 198 and the second pocket side wall 186 has a pair of spaced apart protruding abutment surfaces, a forward second abutment surface 200 and a rear second abutment surface 202.

Figure 10:
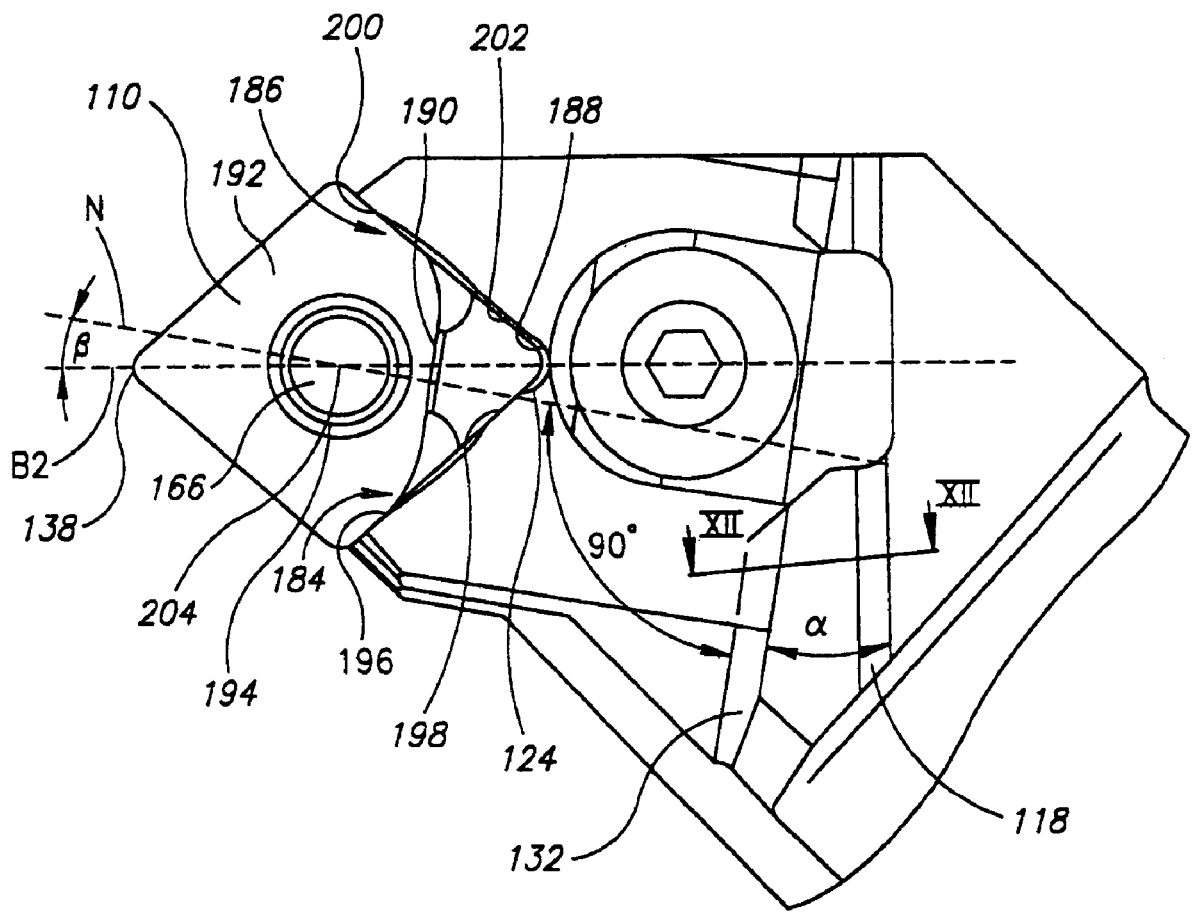
FIG. 10 is partial top view of the third cutting tool in accordance with the present invention with a clamping wedge for releasably clamping a cutting insert with a non-obtuse insert mounting corner with the clamping wedge shown partially transparent.

In FIG. 10, the second cutting insert 110 is shown clamped in a predetermined clamping position. In a top view of the base surface 150, a normal N to the second wedge supporting surface 132, passes through a center 204 of the locking pin 166 and through the first pocket side wall 184. In this disposition, with the second insert mounting corner 124 received in the non-obtuse angle insert receiving corner 188, the second cutting insert 110 bears against the forward first, rear first and forward second abutment surfaces 196, 198 and 200 but not against the rear second abutment surface 202. The normal N forms an angle β with the bisector B2 of the operative cutting corner 138, which is also the bisector of the non-obtuse angle insert receiving corner 188, which also coincides with the second cutting insert's diagonal passing through its second insert mounting corner 124 and its operative cutting corner 138. During clamping, whilst the top second abutment surface 190 continuously bears against the cutting insert's top surface 192, different abutment surfaces of the forward first, rear first, forward second and rear second abutment surfaces 196, 198, 200, 202 may be temporarily employed for positioning the second cutting insert 110, dependent on its initial mounting. The rear second abutment surface 202 serves two functions, namely, it initially acts as a stopper to preclude an initial gross misplacing of the second cutting insert 110 and thereafter to facilitate the positioning of the second cutting insert 110 into its predetermined clamping position.

In a non-binding example, the first cutting insert 106 is a trigon shaped cutting insert and the second quadrilateral cutting insert 110 is generally square shaped having either an 80° or 90° mounting corner and the angle α is generally in the range 6° to 15° with a typical value of 9.5° and the angle β is generally in the range of 4° to 40° with a typical value of 9.5° for a cutting insert with a 90° mounting corner and 9.5° for a cutting insert with an 80° mounting corner.

Figure 11A:
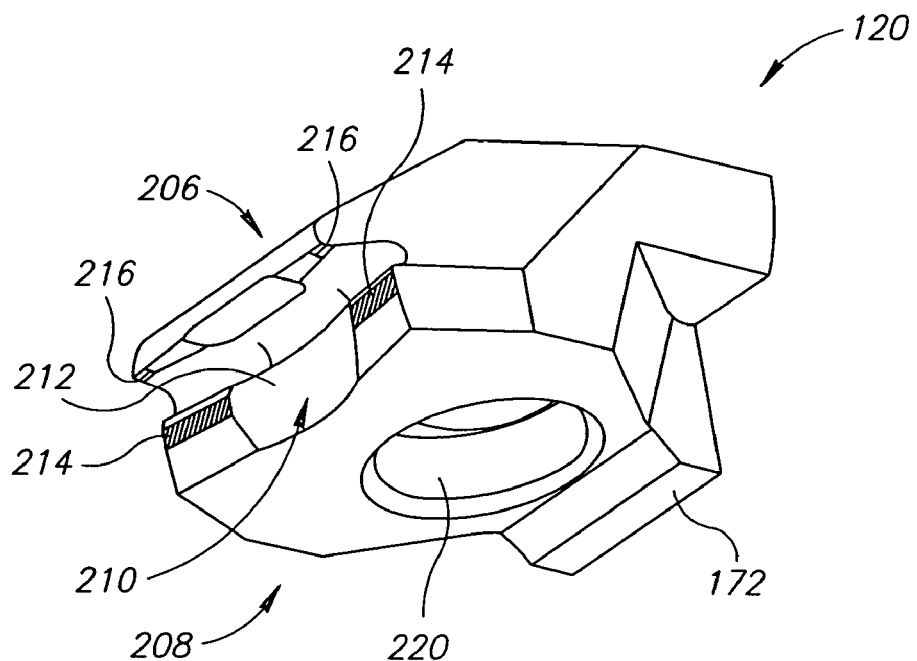
FIG. 11A is a perspective bottom front view of the clamping wedge shown in FIG. 8.
Figure 11B:
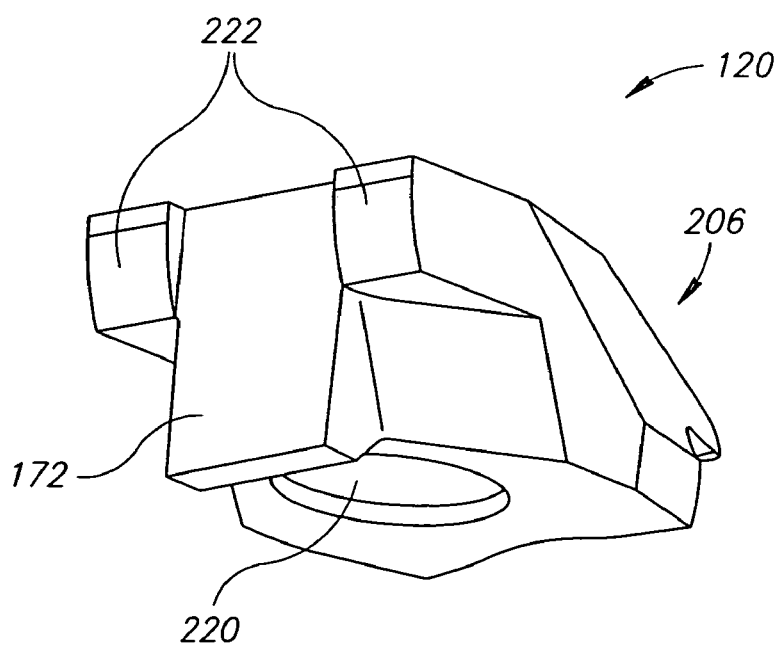
FIG. 11B is a perspective rear view of the clamping wedge shown in FIG. 8.

The first clamping wedge 120, shown in FIGS. 11A and 11B, has a flat and rearwardly inclined front top surface 206 (this feature is best seen in FIG. 8) so as to facilitate chip flow in all feed directions whilst the underside 208 is formed with a first insert receiving pocket 210 having an obtuse angle insert receiving corner 212 with symmetrically disposed rear abutment surfaces 214, and two symmetrically disposed top first abutment surfaces 216 located on either side of the center of the foremost region of the underside 208 of the first clamping wedge 120. The first clamping wedge 120 has an oval shaped through bore 220 through which the clamping screw 158 freely passes. When screwing the clamping screw 158 down into the clamping bore 156, it urges the first clamping wedge 120 downwards, with the key 172 located in the keyslot 154 whereupon rear support surfaces 222 of the first clamping wedge 120 are slidingly urged down the first wedge supporting surface 118. With reference to FIG. 4 and in comparison with FIG. 10, the bisector B1 of the operative cutting corner 136 of the first cutting insert 106 is normal to the first wedge supporting surface 118 so that in a top view of the base surface 150 the bisector B1 passes through the center 96 of the locking pin 63 and bisects the obtuse angle insert receiving corner 212 and the first insert mounting corner 122, whereupon the first cutting insert assumes a predetermined clamping position in a symmetrical seating arrangement.

Figure 12:
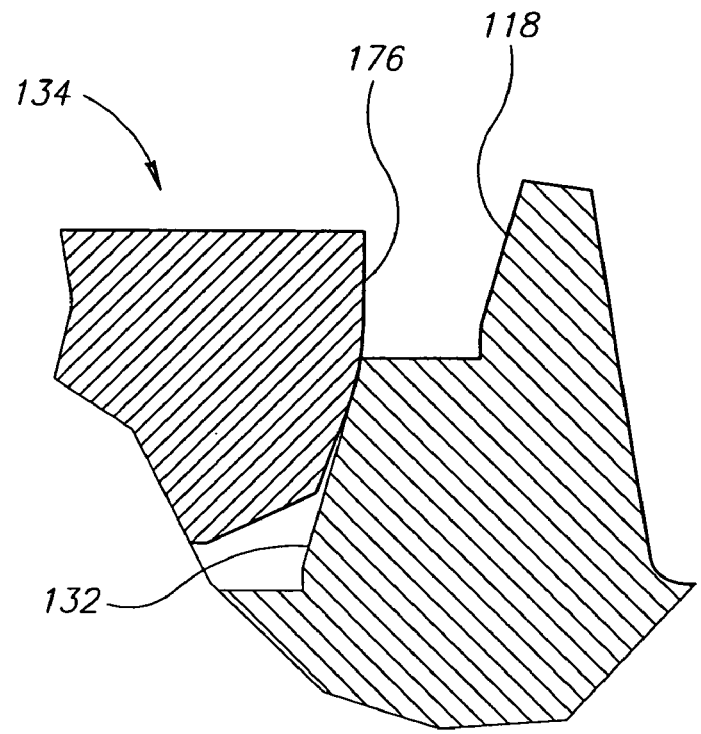
FIG. 12 is a partial cross section taken along the line XII—XII in FIG. 10.

FIG. 12 shows how the rear support surfaces 176 of second clamping wedge 134 abut the lower wedge supporting surface 132, when the second cutting insert 110 is clamped in position.

Figure 13:
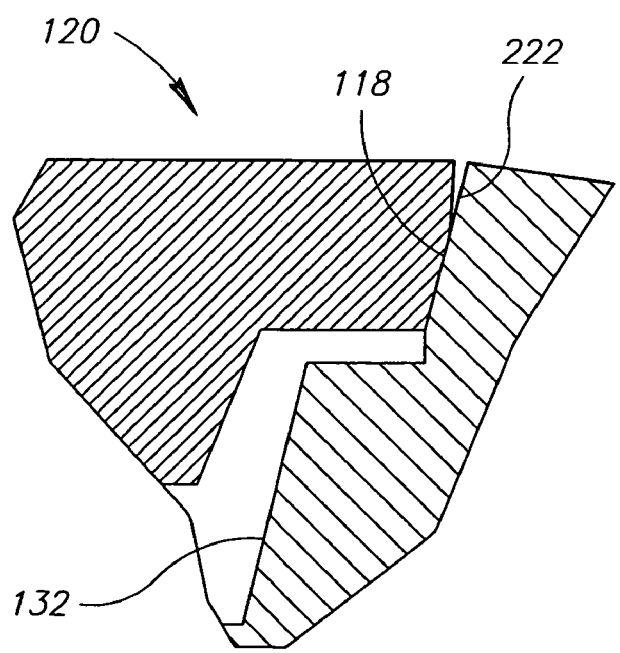
FIG. 13 is a partial cross section similar to that shown in FIG. 12 but with the clamping wedge shown in FIG. 10 replaced by a clamping wedge for releasably clamping a cutting insert with an obtuse insert mounting corner.

FIG. 13 shows a cross section similar to that shown in FIG. 12 illustrating how the rear support surfaces 222 of the first clamping wedge 120 abut the upper wedge supporting surface 118, when the first cutting insert is clamped in position.

While the invention has been described with respect to a limited number of embodiments, it will be appreciated that many variations, modifications and other applications of the invention can be made. For example, the cutting insert holders 104, 108, 140 can be either left or right handed and can be constructed for use without a shim to support the cutting inserts 106, 110.

The invention claimed is:

1. A cutting tool comprising:
a cutting insert holder comprising a holder body having a rear shank portion and a forward clamping portion, wherein:
the forward clamping portion comprises a base surface and a generally upstanding wedge supporting surface extending upwardly and rearwardly from the base surface to a top surface of the clamping portion; and
the wedge supporting surface comprises first and second wedge supporting surfaces that are disposed at an angle α one with respect to the other, the two wedge supporting surfaces being arranged in a stepped formation forming a staggered wedge supporting surface with the second wedge supporting surface being adjacent the base surface and the first wedge supporting surface being adjacent the top surface of the clamping portion, both the first and second wedge supporting surfaces rising above a height of the base surface;
a clamping wedge having an underside provided with an insert receiving pocket, the clamping wedge being in abutment with the wedge supporting surface; and
a cutting insert retained in the insert receiving pocket.

2. The cutting tool according to claim 1, wherein:
the insert receiving pocket comprises first and second pocket side walls forming an insert receiving corner.

3. The cutting tool according to claim 2, wherein:
each of the first and second pocket side walls is provided with spaced apart forward and rear abutment surfaces, the forward abutment surface being farther from the insert receiving corner than the rear abutment surface; and
the cutting insert bears against the forward and rear abutment surfaces of the first pocket side wall and the forward abutment surface of the second pocket side wall, but not against the rear abutment surface of the second pocket side wall.

4. The cutting tool according to claim 2, wherein:
the insert receiving pocket further comprises a top surface extending between the first and second pocket side walls, the top surface having a top abutment surface that abuts a top surface of the cutting insert rearward of a through bore of the cutting insert.

5. The cutting tool according to claim 1, further comprising:
a generally upstanding locking pin; and a through bore formed in the cutting insert; and wherein:
the locking pin is partially in the base surface and partially in the through bore of the cutting insert.

6. The cutting tool according to claim 1, wherein:
the wedge supporting surface is provided with a key slot and a trailing portion of the clamping wedge comprises a key that fits into the key slot.

7. The cutting tool holder according to claim 1, wherein the first and second wedge supporting surfaces are disposed at an angle α in the range 6° to 15°.

8. The cutting tool according to claim 1, wherein:
the clamping wedge has:
    rear support surfaces which abut the first wedge supporting surface, and
    an insert receiving pocket comprising a pair of pocket side walls forming an obtuse angle insert receiving corner; and
the cutting insert has:
    an insert mounting corner with an obtuse insert mounting corner angle.

9. The cutting tool according to claim 8, wherein the cutting insert is trigon shaped.

10. The cutting tool according to claim 1, wherein:
the clamping wedge has:
    rear support surfaces which abut the second wedge supporting surface, and
    an insert receiving pocket comprising a pair of pocket side walls forming a non-obtuse angle insert receiving corner; and
the cutting insert has:
    an insert mounting corner with a non-obtuse insert mounting corner angle.

11. The cutting tool according to claim 10, wherein the cutting insert is quadrilateral shaped and has a mounting corner angle between 80° and 90°.

12. The cutting tool according to claim 10, further comprising:
a generally upstanding locking pin; and
a through bore formed in the cutting insert; and wherein
the locking pin is partially in the base surface and partially in the though bore of the cutting insert; and
a normal to the first wedge supporting surface in a top view of the base surface passes though the center of the locking pin and substantially bisects the non-obtuse angle insert receiving corner.

13. The cutting tool holder according to claim 12, wherein the normal forms an angle β with a bisector of the insert receiving corner in the range of 4° to 40°.

14. The cutting tool according to claim 1, wherein the second wedge supporting surface extends from the base surface to an intermediate surface located between the base surface and the top surface.

15. The cutting tool according to claim 1, further comprising:
a shim seated in a recessed forward portion of the base surface; and wherein:
at least a portion of the cutting insert is between the shim and the clamping wedge.

16. A cutting insert holder comprising a holder body having a rear shank portion and a forward clamping portion, wherein:
the forward clamping portion comprises a base surface and a generally upstanding wedge supporting surface extending upwardly and rearwardly from the base surface to a top surface of the clamping portion; and
the wedge supporting surface comprises first and second wedge supporting surfaces that are disposed at an angle α one with respect to the other, the two wedge supporting surfaces being arranged in a stepped formation forming a staggered wedge supporting surface with the second wedge supporting surface being adjacent the base surface and the first wedge supporting surface being adjacent the top surface of the clamping portion, both the first and second wedge supporting surfaces rising above a height of the base surface, the staggered wedge supporting surface being provided with a recessed portion which functions as a key slot and passes through both the first and second wedge supporting surfaces.

17. The cutting insert holder according to claim 16, wherein the first and second wedge supporting surfaces are disposed at an angle α in the range 6° to 15°.

18. The cutting insert holder according to claim 16, wherein the second wedge supporting surface extends from the base surface to an intermediate surface located between the base surface and the top surface.

19. The cutting tool holder according to claim 16, wherein:
the forward clamping portion comprises a base surface having a clamping bore formed therein; and
the first and second wedge supporting surfaces are both spaced apart from the clamping bore.

20. A cutting insert holder comprising a holder body having a rear shank portion and a forward clamping portion, wherein:
the forward clamping portion comprises a base surface and a generally upstanding wedge supporting surface extending upwardly and rearwardly from the base surface to a top surface of the clamping portion; and
the wedge supporting surface comprises first and second wedge supporting surfaces that are disposed at an angle α one with respect to the other, the two wedge supporting surfaces being arranged in a stepped formation forming a staggered wedge supporting surface with the second wedge supporting surface being adjacent the base surface and the first wedge supporting surface being adjacent the top surface of the clamping portion, both the first and second wedge supporting surfaces rising above a height of the base surface,
the holder being configured to selectively accommodate either:
    a first clamping wedge having a first insert receiving pocket comprising a first pair of pocket side walls forming an obtuse angle insert receiving corner, with a rear support surface of the first clamping wedge abutting the first wedge supporting surface but not the second wedge supporting surface; or
a second clamping wedge having a second insert receiving pocket comprising a second pair of pocket side walls forming a non-obtuse angle insert receiving corner, with a rear support surface of the second clamping wedge abutting the second wedge supporting surface but not the first wedge supporting surface.

21. The cutting insert holder according to claim 20, wherein:
the wedge supporting surface is provided with a key slot for receiving a key formed at a trailing portion of the first and second clamping wedges.

* * * * *